United States Patent [19]

Giles et al.

[11] Patent Number: 5,943,659
[45] Date of Patent: *Aug. 24, 1999

[54] DETERMINISTIC ENCODING OF FUZZY FINITE STATE AUTOMATA IN CONTINUOUS RECURRENT NEURAL NETWORKS

[75] Inventors: C. Lee Giles, Lawrenceville, N.J.; Christian Walter Omlin, Albany, N.Y.; Karvel Kuhn Thornber, Berkeley Heights, N.J.

[73] Assignee: NEC Research Institute, Inc., Princeton, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/538,662

[22] Filed: Oct. 3, 1995

[51] Int. Cl.⁶ .............................. G06F 15/18; G05B 13/00
[52] U.S. Cl. ................................. 706/2; 706/23; 706/30
[58] Field of Search .................... 395/22, 3, 51, 395/61; 706/30, 25, 26, 31, 2, 6, 23

[56] References Cited

U.S. PATENT DOCUMENTS 5,168,549 12/1992 Takagi et al. .............................. 706/6
5,471,381 11/1995 Khan ................................. 364/148.93
5,524,176 6/1996 Narita et al. ................................. 706/2
5,606,646 2/1997 Khan et al. ................................. 706/2
5,761,384 6/1998 Inoue et al. ................................. 706/2

FOREIGN PATENT DOCUMENTS 2-292602 12/1990 Japan .............................. G06F 15/18

OTHER PUBLICATIONS

Fukuda et al, "Neuromorphic Control: Adaption and Learning", IEEE Transactions on Industrial Electronics, Dec. 1992.

Unal et al, "A Fuzzy State Machine Implementation Based on a Neural Fuzzy System", Inter. Conf. on Fuzzy Systems, IEEE 1994.

Rao et al., "Neural Networks in Control Systems", Wescanex, Communications, Computer and Power in the Modern Environment, IEEE 1993.

*Primary Examiner*—Robert W. Downs
*Attorney, Agent, or Firm*—Philip J. Feig; Andrew G. Isztwan

[57] ABSTRACT

Based on the encoding of deterministic finite-state automata (DFA) in discrete-time, second-order recurrent neural networks, an algorithm constructs an augmented recurrent neural network that encodes a FFA and recognizes a given fuzzy regular language with arbitrary accuracy.

4 Claims, 5 Drawing Sheets

Input: FFA $M = \langle \Sigma, Q, R, F, Z, \delta, \omega \rangle$ with $\Sigma = \{a_1, a_2, \text{K}, a_K\}$, $Q = \{q_1, q_2, \text{K}, q_N\}$, $R = \{q_1\}$ is the crisp start state, $F \subseteq Q$ is the set of accepting states, $Z$ is the output alphabet, $\delta : \Sigma \times Q \to Q$ are the state transitions, $\omega : Q \to Z$ is the output map.

Output: Second-order recurrent neural network with L(RNN) = L(FFA), i.e. the recurrent network assigns with arbitrary precision the same membership to all strings as the fuzzy automaton. The network is unique up to labeling of neurons.

Algorithm Initialization:

1. Transform $M$ into a unique deterministic acceptor $M'$ with $N' > N$ states that computes the string membership $\mu_G$ for arbitrary strings. Let $M'$ be in state $q'_i$ after some string $s$ has been read; then the label $0 < \mu_i \leq 1$ associated with state $q'_i$ indicates the membership assigned to $s$ by $M$.

2. choose $N'$ neurons with sigmoidal discriminant function $g(x) = \dfrac{1}{1 + e^{-x}}$ and one nonrecurrent output neuron with linear discriminant function.

3. for each $a_k \in \Sigma$ construct an input vector $(0, \text{K}, 0, I_{K-1}, 1, I_{K+1}, 0, \text{K}, 0)$ of length $K$ 4. choose weight strength $H$ such that $$\phi_\Delta^-(H) < \frac{1}{2N'}\left(1 + \frac{1}{H}\right) \text{ with } \phi_\Delta^+(H) > \frac{1}{4}\left(3 + \frac{1}{H}\right)$$

where $\phi_\Delta^-(H)$ and $\phi_\Delta^+(H)$ are the fixed points of the discriminant function $h_\Delta(x, H)$

FIG. 4B

Network Construction:

5. for $i = 1 K\ N'$
   $b_i = -H/2;$
   for $j = 1 K\ N'$
   for $k = 1 K\ K$
   $W_{ijk} = +H$ if $\delta(q_i, a_k) = q_i$; $W_{ijk} = -H$ if $\delta(q_i, a_k) \neq q_i$;
   $W_{0ik} = \mu_i;$ Network Dynamics:

6. $S_i^{t+1} = g\left(b_i + \sum_{j,k>0} W_{ijk} S_j^t I_k^t\right) (i > 0)$
   $S_0^{t+1} = \sum_{j>0} \mu_j S_j^{t+1}$ Network Initialization:

7. Before reading a new string, set the initial network state to:
   $S^0 = (S_0^0, S_1^0, K, S_{N'}^0) = (S_0^0, 1, 0, K, 0);$ the value of $S_0^0$ is computed as $S_0^0 = \mu_1$ (see network dynamics).

Network Performance:

8. The output of $S_0^f$ after reading a string $s$ of length $f$ is the string membership $\mu_G(s)$.

Network Complexity:

9. number of neurons: $N' + 1$; number of weights: $O(M\ N')$;
   maximum fan-out: 3M
   weight alphabet $\sum_w = \{-H, -H/2, 0, H, \mu_1, K, \mu_{N'}\}$

FIG. 5

DETERMINISTIC ENCODING OF FUZZY FINITE STATE AUTOMATA IN CONTINUOUS RECURRENT NEURAL NETWORKS

FIELD OF THE INVENTION

The present invention relates to fuzzy finite state automata (FFAs) capable of modeling dynamic processes whose current state depends on the current input and previous states. Specifically, the invention concerns an augmented recurrent neural network which encodes a fuzzy finite state automata and recognizes a given fuzzy regular language with arbitrary accuracy.

BACKGROUND OF THE INVENTION

There has been an increased interest in combining artificial neural networks and fuzzy systems. Fuzzy logic provides a mathematical foundation for approximate reasoning. Fuzzy logic controllers have proven very successful in a variety of applications such as control of roll and movement for a flexible wing aircraft, controller in a warm water plant, and traffic control. The parameters of adaptive fuzzy systems have clear physical meanings which facilitates the choice of their initial values. Furthermore, rule-based information can be incorporated into fuzzy systems in a systematic way.

Artificial neural networks emulate on a small scale the information processing mechanisms found in biological systems which are based on the cooperation of neurons which perform simple operations and on their ability to learn from examples. Artificial neural networks have become valuable computational tools in their own right for tasks such as pattern recognition, control, and forecasting.

Fuzzy systems and multilayer perceptions are computationally equivalent, i.e. they are both universal approximators. Recurrent neural networks have been shown to be computationally equivalent with Turing machines; whether or not recurrent fuzzy systems are also Turing equivalent remains an open question. While the methodologies underlying fuzzy systems and neural networks are quite different, their functional forms are often similar. The development of powerful learning algorithms for neural networks has been beneficial to the field of fuzzy systems which adopted some learning algorithms; e.g. there exist backpropagation training algorithms for fuzzy logic systems which are similar to the training algorithms for neural networks.

In some cases, neural networks can be structured based on the principles of fuzzy logic as described in the article by P. Goode et al entitled "A hybrid fuzzy/neural systems used to extract heuristic knowledge from a fault detection problem," in Proc. of the Third IEEE Conference on Fuzzy Systems, vol. III pp. 1731–1736, 1994 and in an article by C. Perneel et al entitled "Fuzzy Reasoning and Neural Networks for Decision Making Problems in Uncertain Environments" in Proc. of the Third IEEE Conference on Fuzzy Systems, vol. II, pp. 1111–1125, 1994. Neural network representations of fuzzy logic interpolation have also been used within the context of reinforcement learning.

A large class of problems where the current state depends on both the current input and the previous state can be modeled by finite-state automata or their equivalent grammars. The next step is to determine whether recurrent neural networks can also represent fuzzy finite-state automata (FFAs) and thus be used to implement recognizers of fuzzy regular grammars.

Fuzzy grammars have been found to be useful in a variety of applications such as in the analysis of X-rays, in digital circuit design, and in the design of intelligent human-computer interfaces. The fundamentals of FFAs have been discussed in articles by B. Gaines et al entitled "The Logic of Automata" in Int'l Journal of General Systems, vol. 2, pp. 191–208, 1976, by E. Santos entitled "Maximum Automata" in Information and Control, vol. 13, pp. 363–377, 1968 and by W. Wee et al entitled "A Formulation of Fuzzy Automata and its Applications as a Model of Learning Systems," in IEEE Transactions on System Science and Cybernetics, vol. 5, pp. 215–223, 1969, each without presenting a systematic method for machine synthesis. Neural network implementations of fuzzy automata have been proposed in an article by J. Grantner et al entitled "Synthesis and Analysis of Fuzzy Logic Finite State Machine Models," in Proc. of Third IEEE Conference on Fuzzy Systems, vol. I, pp. 205–210, 1994, and in another article by J. Grantner et al entitled "VLSI Implementations of Fuzzy Logic Finite State Machines," in Proc. of the Fifth IFSA Congress, pp. 781–784, 1993, and in an article by S. Lee et al entitled "Fuzzy Neural Networks," in Mathematical Biosciences, vol. 23, pp. 151–177, 1975, and an article by F. Unal et al entitled "A Fuzzy Finite State Machine Implementation Based on a Neural Fuzzy System," in Proc. of the Third Int'l Conf. on Fuzzy Systems, vol. 3, pp. 1749–1754, 1994. The synthesis method proposed by Grantner et al, supra, uses digital design technology to implement fuzzy representations of states and outputs. In Unal et al, supra, the implementation of a Moore machine with fuzzy inputs and states is realized by training a feedforward network explicitly on the state transition table using a modified backpropagation algorithm. The fuzzification of inputs and states reduces the memory size that is required to implement the automaton in a microcontroller, e.g. antilock braking systems. In related work, an algorithm for implementing weighted regular languages in neural networks with probabilistic logic nodes was discussed in an article by T. Ludermir entitled "Logical Networks Capable of Computing Weighted Regular Languages," in Proc. of the Int'l Joint Conf. on Neural Networks 1991, vol. 11, pp. 1687–1692, 1991. A general synthesis method for synchronous fuzzy sequential circuits has been discussed in an article by T. Watanabe et al entitled "Synthesis of Synchronous Fuzzy Sequential Circuits," in Proc. of the Third IFSA World Congress, pp. 288–291, 1989. A synthesis method for a class of discrete-time neural networks with multilevel threshold neurons with applications to gray level image processing has been proposed in an article by J. Si et al entitled "Analysis and Synthesis of a Class of Discrete-Time Neural Networks with Multilevel Threshold Neurons," in IEEE Trans. on Neural Networks, vol. 6, no. 1, p. 105, 1995.

SUMMARY OF THE INVENTION

The present invention concerns the representation of fuzzy finite state automata in recurrent neural networks with continuous discriminant functions. Fuzzy finite state automata are encoded in recurrent networks that compute string membership functions with arbitrary accuracy. An algorithm is used which transforms fuzzy finite state automata into equivalent deterministic finite automata (DFA) which compute fuzzy string membership. The fuzzy FFA states are transformed into crisp DFA states. A membership label $\mu_i$ with $0 < \mu_1 \leq 1$ is associated with each accepting DFA state; non-accepting DFA states have label $\mu_i = 0$. The membership of a string is equal to the membership label of the last visited DFA state.

Parameters in fuzzy systems have clear physical meaning and rule-based and linguistic information can be incorporated into adaptive fuzzy systems in a systematic manner. Also, there are powerful algorithms for training various neural network models. However, most of the proposed combined fuzzy systems and neural network architectures are only capable of processing static input-output relationships, i.e. they are incapable of processing temporal input sequences of arbitrary length. Fuzzy finite state automata (FFA) can model dynamic processes whose current state depends on the current input and previous states. Unlike in the case of deterministic finite-state automata (DFAs), FFAs are not in one particular state, rather each state is occupied to some degree defined by a membership function. The present invention concerns an algorithm that constructs an augmented recurrent neural network that encodes an FFA and recognizes a given fuzzy regular language with arbitrary accuracy. That is, fuzzy systems are combined with neural networks because the resultant fuzzy neural system exhibits the advantages of both paradigms.

A recurrent network is constructed from the original architecture used for DFA encoding by connecting the recurrent state neurons to a linear output neuron. The weights of these connections are set to the value of the membership labels of the DFA states. The accuracy of the computation of the string membership function depends on the network size, the number of DFA states which membership label $\mu_1 > 0$, and the weight strength H used to encode the finite state dynamics in the recurrent network. The larger H is chosen, the more accurate the network computes membership functions.

A principal object of the present is therefore, the provision of combining fuzzy systems with neural networks.

Another object of the invention is to modify neural networks that can represent DFAs to accommodate FFAs.

A further object of the invention is to encode FFAs into recurrent networks such that a constructed network assign membership gender to strings of arbitrary length with arbitrary accuracy.

Further objects of the invention will become more clearly apparent when the following description is read in conjunction with the accompanying drawing.

DETAILED DESCRIPTION OF THE INVENTION

Figure 1:
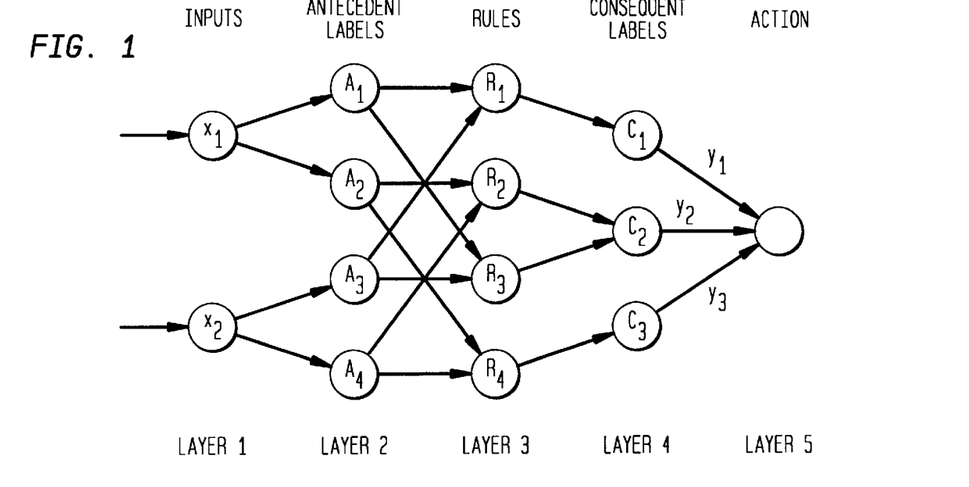
FIG. 1 is a schematic diagram representation of a fuzzy neural network.

Referring now to the figures and to FIG. 1 in particular, there is shown a typical fuzzy neural network used for intelligent control. Typically, such networks are initialized with linguistic rules of the form IF $x_1$ is $A_1$ AND $x_2$ is $A_3$ THEN $y_1$ is $C_1$ where $A_1$, $A_3$ and $C_1$ are fuzzy sets and $x_1$, $x_2$ and $y_1$ are linguistic input and output variables, respectively. The network has an input layer comprising real-valued input variables (e.g. linguistic variables), a fuzzification layer which maps input values $x_i$ to fuzzy sets $A_i$, an interpolation layer which computes the conjunction of all antecedent conditions in a rule (e.g. differential softmin operation), a defuzzification layer which computes the output for a given rule (e.g. mean of maximum method), and an output layer which combines the recommendations from all fuzzy control rules in the rule base (e.g. weighted sum). Thus, fuzzy neural networks play the role of fuzzy logic interpolation engines. The term fuzzy inference is also often used to describe the function of a fuzzy neural network. The term fuzzy logic interpolation is used in order to distinguish between the function of fuzzy neural networks and fuzzy logic inference where the objective is to obtain some properties of fuzzy sets $B_1, B_2, \ldots$ from properties of fuzzy sets $A_1, A_2, \ldots$ with the help of an inference scheme $A_1, A_2, \ldots \to B_1, B_2, \ldots$ which is governed by a set of rules. The rules are then fine tuned using a standard training algorithm for multilayer perceptions.

There exist applications where the variables of linguistic rules are recursive, i.e. the rules of the form IF $x(t-1)$ is $\alpha$ AND $u(t-1)$ is $\beta$ THEN $x(t)$ is $\gamma$ where $u(t-1)$ and $x(t-1)$ represent input and state variables, respectively. The value of the state variable $x(t)$ depends on both the input $u(t-1)$ and the previous state $x(t-1)$. Feed-forward neural networks do not have the computational capabilities to represent such recursive rules when the depth of the recursion is not known a priori. Recurrent neural networks have the ability to store information over indefinite periods of time and are thus potentially useful for representing recursive linguistic rules.

Regular languages represent the smallest class of formal languages in the Chomsky hierarchy. Regular languages are generated by regular grammars.

A regular grammar G is defined as a quadruple G=<S,N,T,P> where S is the start symbol, N and T are non-terminal and terminal symbols, respectively, and P are productions of the form A→α or A→αB where A,B∈N and α∈T.

The regular language generated by G is denoted L(G).

Associated with each regular language L is a deterministic finite-state automaton (DFA) M which is an acceptor for the language L(G), i.e. L(G)=L(M). DFA M accepts only strings which are a member of the regular language L(G).

A DFA M is defined as a 5-tuple M=<ΣQ,R,F,δ> where Σ={$\alpha_1, \ldots, \alpha_m$} is the alphabet of the language L, Q={$q_1, \ldots, q_n$} is a set of states, R∈Q is the start state, F⊆Q is a set of accepting states and δ: Q×Σ→Q defines state transitions in M.

A string x is accepted by the DFA M and hence is a member of the regular language L(M) if an accepting state is reached after the string x has been read by M. Alternatively, a DFA M can also be considered a generator which generates the regular language L(M).

Various methods have been proposed for implementing DFAs in recurrent neural networks. Our preferred method is to use discrete-time, second-order recurrent neural networks with sigmoidal discriminant functions which update their current state according to the following equations:

$$S_i^{(t+1)} = g(a_i(t)) = \frac{1}{1+e^{-a_i(t)}}, \quad a_i(t) = b_i + \sum_{j,k} W_{ijk} S_j^{(t)} I_k^{(t)}, \quad (1)$$

where $b_i$ is the bias associated with hidden recurrent state neurons $S_j$; $I_k$ denotes the input neuron for symbol $\alpha_k$. The product $S_j^{(t)} I_k^{(t)}$ directly corresponds to the state transition $\delta(q_j, \alpha_k)=q_i$. A DFA implemented in recurrent neural networks with second-order weights is described in U.S. patent application Ser. No. 08/400,732, now U.S. Pat. No. 5,706,400 which is incorporated herein by reference.

DFAs can be encoded in discrete-time, second-order recurrent neural networks with sigmoidal discriminant functions such that the DFA and constructed network accept the same regular language. The desired finite-state dynamics are encoded into a network by programming a small subset of all available weights to values +H and −H leading to a nearly orthonormal internal DFA state representation. Similarly, the weights of a network's output neuron $S_0$ are programmed to +H or −H for correct string classification. This leads to the following special form of the equation governing the network dynamics:

$$S_i^{(t+1)} = g(x, H) = \frac{1}{1 + e^{H(1-2x)/2}} \quad (2)$$

where x is the input to neuron $S_i$.

There exist only two kinds of signals in the above sigmoid neuron of a constructed neural network: Recurrent state neurons have high output signals only when they correspond to the current DFA state; all other recurrent neurons have low output signals. There exist upper and lower bounds on the magnitude of low and high signals, respectively:

The low signals in a constructed neural networks with n recurrent state neurons are bounded from above by the fixed point $\phi_\Delta^-$ of the function $$x_i^{t+1} = g_{\Delta^-}^{t+1}(x_i^0, H) = \begin{cases} g(0, H) & t = 0 \\ g(n \cdot g_{\Delta^-}^t(x_i^{t-1}, H), H) & t > 0 \end{cases} \quad (3)$$

Similarly, it is possible to quantify high signals:

The high signals in a constructed neural networks with arbitrary number of recurrent state neurons are bounded from below by the fixed point $\phi_\Delta^+$ of the function $$x_i^{t+1} = g_{\Delta^+}^{t+1}(x_i^0, H) = \begin{cases} g(1, H) & t = 0 \\ g(g_{\Delta^+}^t(x_i^{t-1}, H) - g_{\Delta^-}^t(x_i^{t-1}, H), H) & t > 0 \end{cases} \quad (4)$$

In order for the regular languages recognized by a DFA and its neural network implementation to be identical, the network's internal DFA representation must remain sufficiently stable for strings or arbitrary length.

An encoding of DFA states in a second-order recurrent neural network is called stable if there exists exactly one recurrent neuron with a high output signal larger than 0.5 and all remaining recurrent neurons have low output signals less than 0.5.

Notice that the output neuron $S_0$ is not included in the above definition since it is not recurrent and thus has no influence on stability of the DFA encoding.

The network's internal DFA representation remains stable if the neuron's input never exceed or fall below a certain threshold value in the case of low and high signals, respectively. These two conditions lead to quantitative bounds on the fixed points $\phi_\Delta^-(H)$ and $\phi_\Delta^+(H)$ of the functions $g_\Delta^-$ and $g_\Delta^+$.

The assertion of stability of the internal finite state dynamics makes use of the following definitions: Let $D_{ik}$ denote the number of states $q_j$ that make transitions to state $q_i$ for input symbol $\alpha_k$. Further define $D_i = \max\{D_{ik}\}$ (maximum number of transitions to $q_i$ over all input symbols) and $D = \max\{D_i\}$ (maximum number of transitions to any state over all input symbols). Then, $\rho = D/n$ denotes the maximum fraction of all states $q_j$ for which $\delta(\{q_j\}, \alpha_k) = q_i$.

Theorem 1 For some given DFA M with n states and m input symbols, let D denote the maximum number of transitions to any state over all input symbols of M, and let $\rho = D/n$. Then, a sparse recurrent neural network with n+1 sigmoidal state neurons and m input neurons can be constructed from M such that the internal state representation remains stable, i.e. $S_i > 0.5$ when $q_i$ is the current DFA state and $S_i < 0.5$ otherwise if $$\phi_\Delta^-(H) = < \frac{1}{2\rho n}\left(1 + \frac{1}{H}\right) \text{ with } \phi_\Delta^+(H) > \frac{1}{4}\left(3 + \frac{1}{H}\right)$$

for a proper choice of H.

The above conditions implicitly put lower bounds on the magnitude of H which guarantee stable finite state dynamics for a network of given size. As such, they represent worst cases, i.e. the finite state dynamics of a given neural network implementation may remain stable for smaller values of H even for very large networks.

Since deterministic and fuzzy finite state automata share a common underlying structure expressed in terms of state transitions, it is possible to use the result on the stability of the network dynamics for DFAs to implement fuzzy finite-state automata.

Begin by defining the class of fuzzy automata for which a synthesis method is developed for recurrent neural networks:

A fuzzy regular grammar $\tilde{G}$ is defined as a quadruple $\tilde{G} = <S,N,T,P>$ where S is the start symbol, N and T are non-terminal and terminal symbols, respectively, and P are productions of the form $A \to^\theta \alpha$ or $A \to^\theta \alpha B$ where $A, B \in N$, $\alpha \in T$ and $0 < \theta < 1$.

Unlike in the case of DFAs where strings either belong or do not belong to some regular language, strings of a fuzzy language have graded membership.

Given a regular fuzzy grammar $\tilde{G}$, the membership grade $\mu_G(x)$ of a string $x \in T$ in the regular language $L(\tilde{G})$ is defined as the maximum value of any derivation of x, where the value of a specific derivation of x is equal to the minimum weight of the productions used:

$$\mu_G(x) = \mu_G(S \overset{*}{\Rightarrow} x) = \max_{S \overset{*}{\Rightarrow} x} \min[\mu_G(S \to \alpha_1), \mu_G(\alpha_1 \to \alpha_2), ..., \mu_G(\alpha_m \to x)]$$

This is similar to the definition of stochastic regular languages where the min- and max-operators are replaced by the product- and sum-operators, respectively. Both fuzzy and stochastic regular languages are examples of weighted regular languages.

A fuzzy finite state automaton (FFA) $\tilde{M}$ is defined as a 6-tuple $\tilde{M} = <\Sigma, Q, Z, \tilde{R}, \delta \omega>$ where $\Sigma$, Q, and $q_0$ are the same as in DFAs; Z is a finite output alphabet, $\tilde{R}$ is the fuzzy initial state, $\delta: \Sigma \times Q \times [0,1] \to Q$ is the fuzzy transition map and $\omega: Q \to Z$ is the output map.

In present invention, a restricted type of fuzzy automaton is considered whose initial state is not fuzzy, and $\omega$ is a function from F to Z, where F is a non fuzzy subset of states, called final states. Any fuzzy automaton as described in definition of (FFA) $\tilde{M}$ is equivalent to a restricted fuzzy automaton. Notice that a FFA reduces to a conventional DFA by restricting the transition weights to 1.

As in the case of DFAs and regular grammars, there exist a correspondence between FFAs and fuzzy regular grammars:

Theorem 2 For a given fuzzy grammar $\tilde{G}$, there exists a fuzzy automaton $\tilde{M}$ such that $L(\tilde{G})=L(\tilde{M})$.

The goal is to use only continuous (sigmoidal and linear) discriminant functions for the neural network implementation of FFAs. The following results greatly simplify the encoding of FFAs in recurrent networks with continuous discriminant functions.

Theorem 3 Given a regular fuzzy grammar $\tilde{G}$, there exists a deterministic finite state automaton M with output alphabet $Z \subseteq \{\theta: \theta \text{ is a production weight}\} \cup \{0\}$ which computes the membership function $\mu: \Sigma^* \to [0,1]$ of the language $L(\tilde{G})$.

An immediate consequence of this theorem is the following corollary: Given a regular fuzzy grammar $\tilde{G}$, there exist an equivalent unambiguous grammar G in which productions have the form $A \to^{1.0} \alpha B$ or $A \to^{\theta} \alpha$.

Figure 2A:
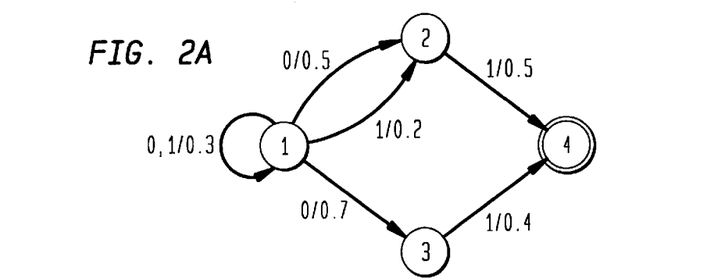
FIGS. 2(a) and 2(b) show the transformation of a FFA into its corresponding DFA.
Figure 2B:
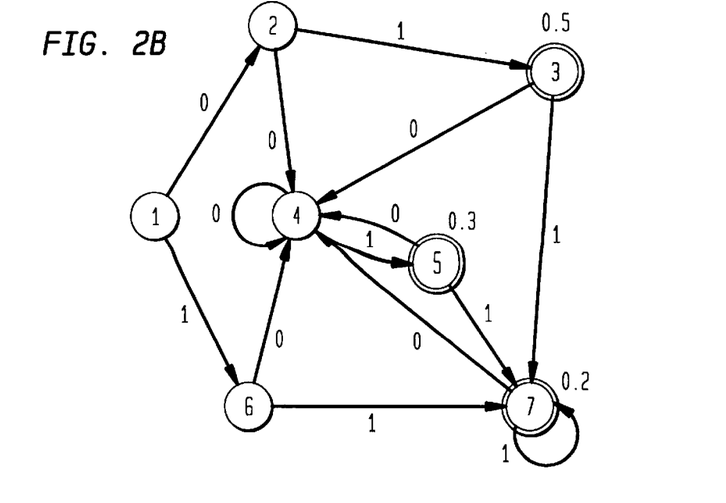

For example, consider a fuzzy regular grammar with non-terminal symbols $N=\{A, B\}$, terminal symbols $T=\{0,1\}$ and the following production rules:

$S \to^{0.3} 0S \quad S \to^{0.5} 0A \quad S \to^{0.7} 0B \quad S \to^{0.3} 1S \quad S \to^{0.2} 1A \quad A \to^{0.5} 1 \quad B \to^{0.4} 1$ The FFA which accepts the strings generated by the above grammar is shown in FIG. 2(a). Only transitions which correspond to the production rules are shown; implicitly, all other transitions leads to a rejecting garbage state. The deterministic acceptor of the FFA which computes the same string membership is shown in FIG. 2(b). In FIG. 2(a), a fuzzy finite state automaton with weighted state transitions is shown. State 1 is the automaton's start state; accepting states are drawn with double circles. Only paths that can lead to an accepting state are shown (transitions to garbage states are not shown explicitly). In FIG. 2(b) corresponding deterministic finite state automaton which compute the membership function strings are shown. The accepting states are labeled with the degree of membership. Notice that all transitions in the DFA have weight 1.

The result of theorem 1 concerning the stability of the programmed network dynamics applies to finite-state automata whose states are crisp, i.e. the degree with which a state is the automaton's current state is either 0 or 1. On the other hand, FFAs can be in several states at any given time with different degrees of vagueness; vagueness is specified by a real number from the interval [0,1].

Theorem 3 enables a transformation of any FFA into a deterministic automaton which computes the same membership function $\mu:\Sigma^* \to [0,1]$. It is necessary to demonstrate how to implement the computation of $\mu$ with continuous discriminant functions.

For that purpose, the network architecture used for encoding DFAs is augmented with additional weights which connect the recurrent state neurons to a linear output neuron. The recurrent neurons shown in FIG. 3 implement the desired finite state dynamics, i.e. transitions between crisp states. Making the finite state dynamics stable for arbitrary string lengths is described above. The weights connecting the recurrent state neurons with the linear output neuron are the memberships assigned to the DFA states after the transformation of a FFA into an equivalent DFA. The algorithm for encoding FFAs in second-order recurrent neural networks is shown in FIG. 4.

Figure 3:
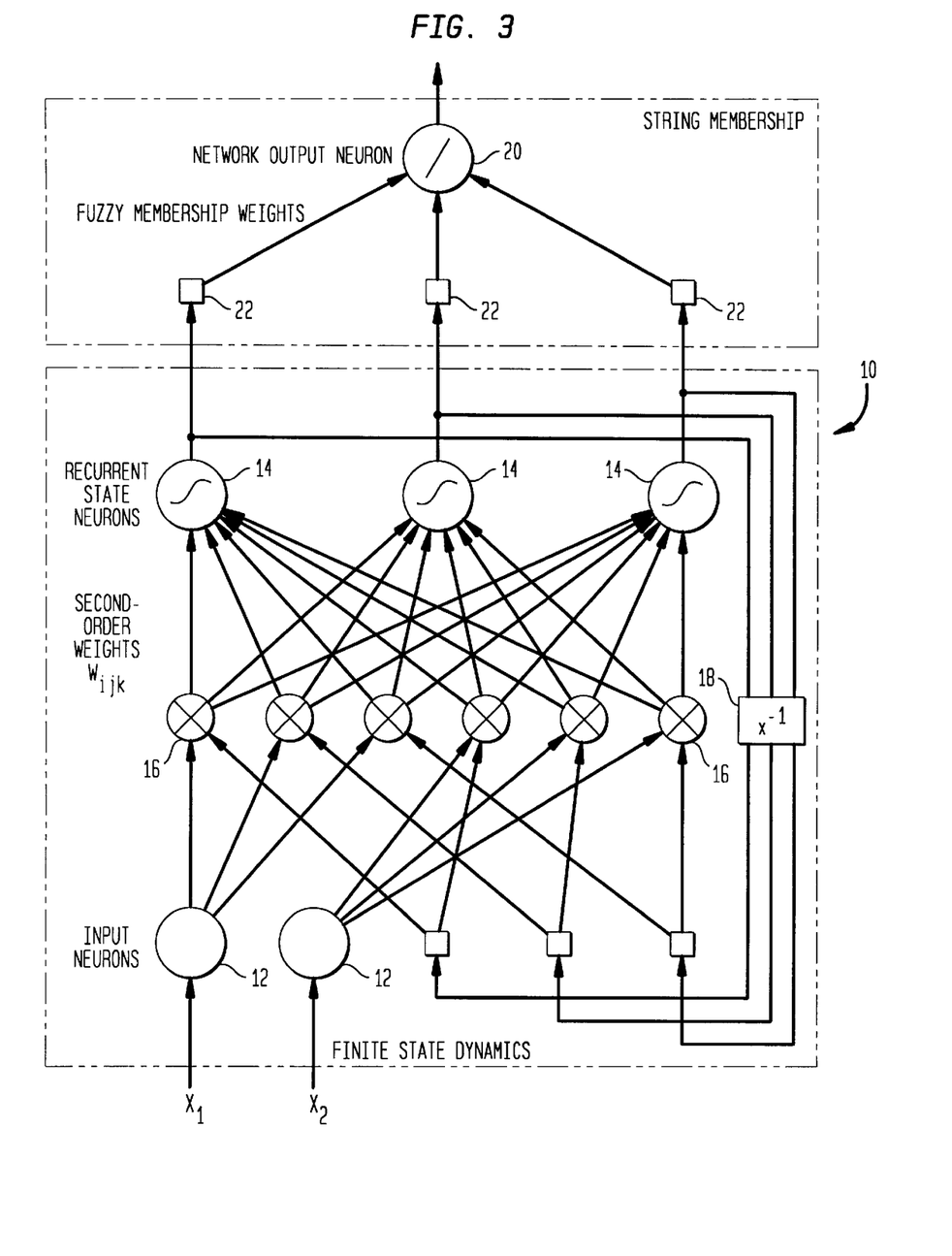
FIG. 3 is a schematic diagram of a recurrent network architecture for a fuzzy finite state automata.
Figure 4A:
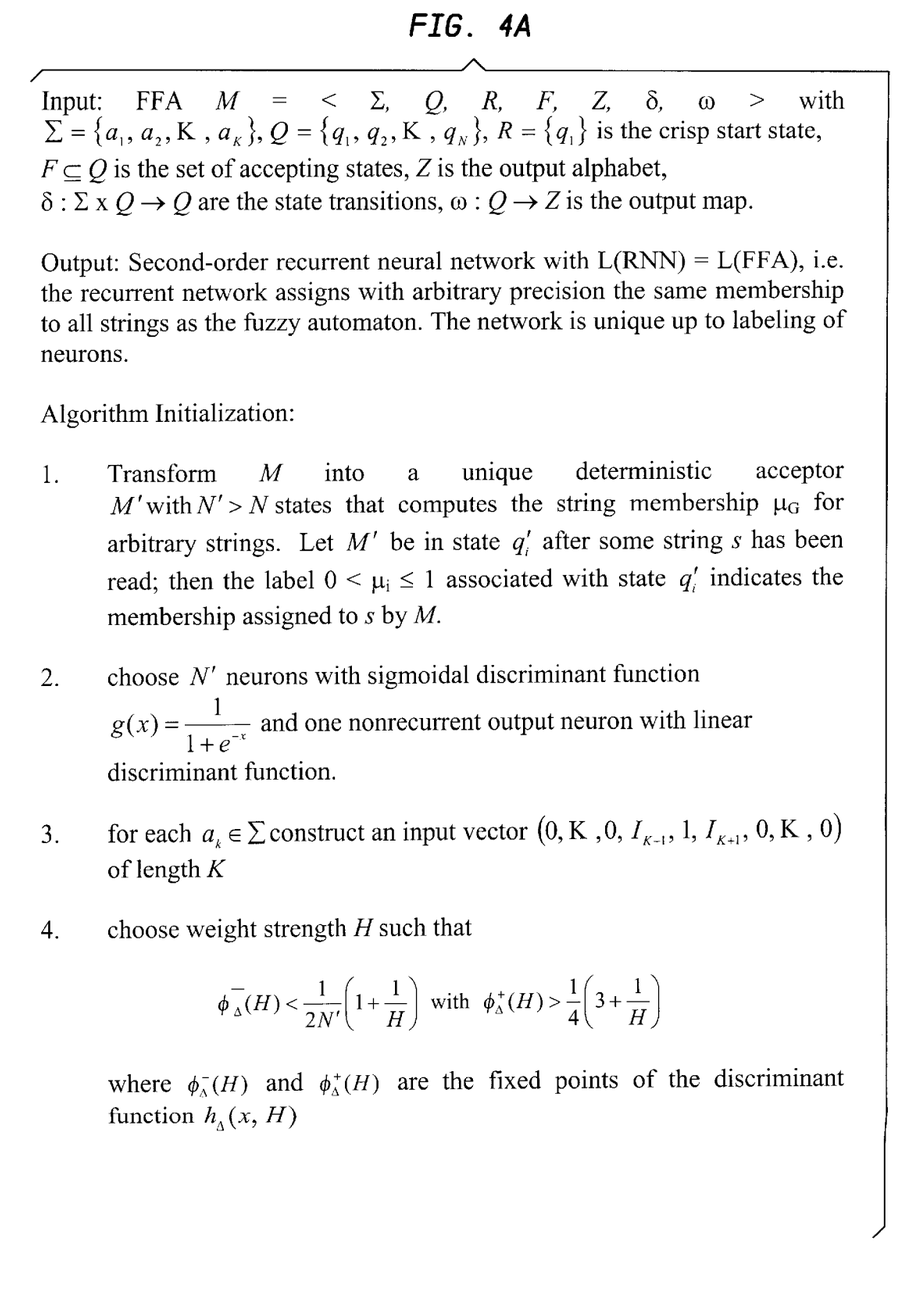
FIG. 4 is an algorithm for encoding arbitrary FFAs in second-order recurrent neural networks.
Figure 4B:
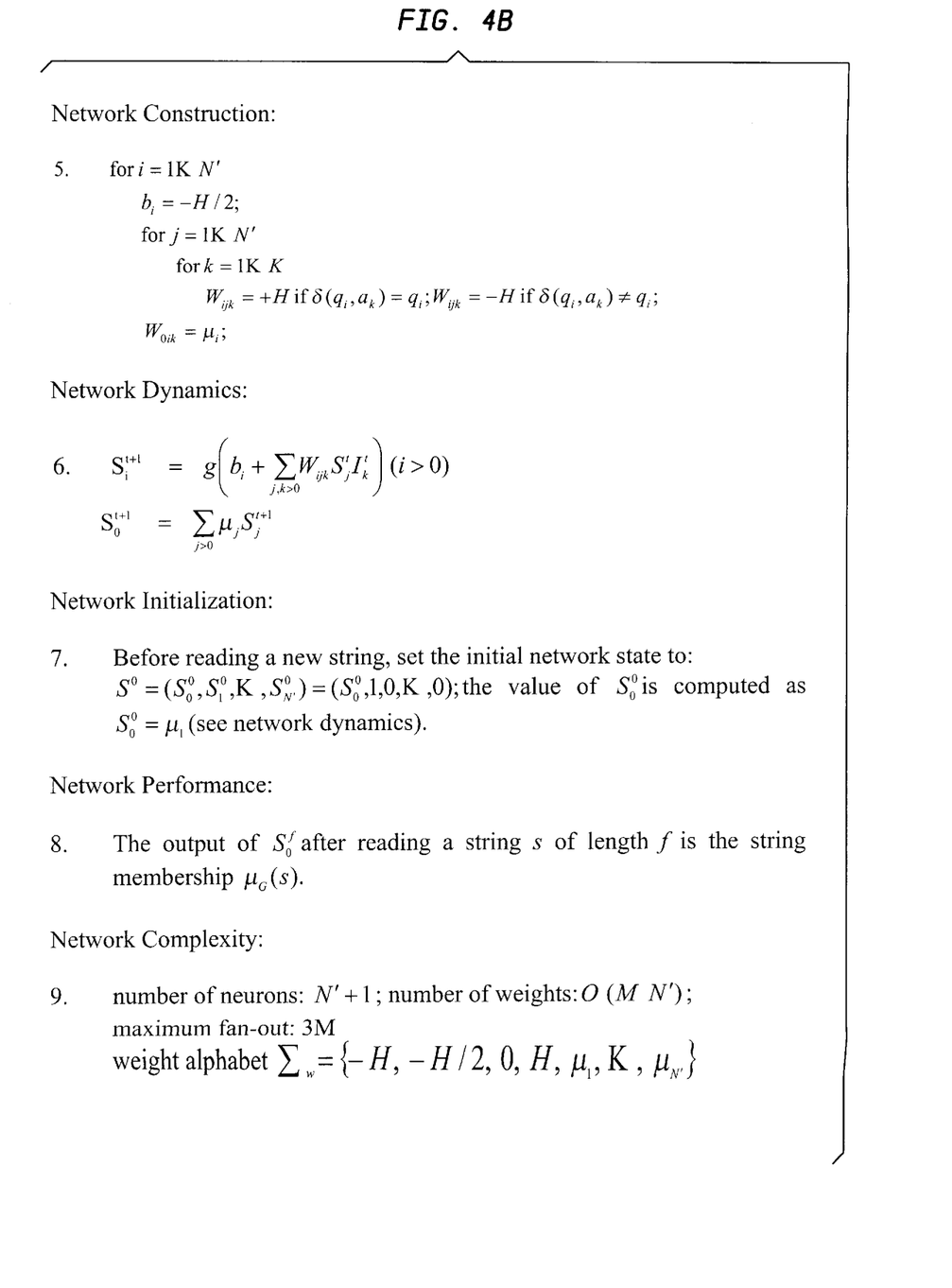

The network architecture for implementing fuzzy automata is shown in FIG. 3. It is assumed that a given FFA has been transformed into an equivalent deterministic acceptor. Inputs are fed into the network 10 via input neurons 12. There is a one-to-one mapping between symbols of an automaton's alphabet and a network's input neurons ("one-hot" encoding). Strings are presented to the network one symbol per time step. The output of each of the recurrent state neurons 14 is computed from the weighted sum of all their inputs which passes through a sigmoidal discriminant function 16 to compute the current state of the network using equation 1. For the next time step, the current outputs of the state neurons 14 are fed back via a time delay $z^{-1}$ 18. This recurrent structure encodes the finite state dynamics of a FFA. All recurrent state neurons 14, represented by $S_j$ which correspond to FFA states $q_j$ with $\mu_j > 0$ are connected to a linear network output neuron 20 via fuzzy membership weights 22, represented as $0 < \mu_j < 1$. The network output neuron 20 computes its output as $$\sum_j \mu_j S_j^t$$

where the sum is taken over all recurrent state neurons 14. This structure computes string membership which is subjected to fuzzy membership weights before being summed by network output neuron 20. The output of network output neuron is the fuzzy finite state automata output. The algorithm for encoding FFAs in second-order recurrent neural networks is shown in FIG. 4.

The upper and lower bounds on the low and high signals is described above in conjunction with equations 3 and 4, respectively. Let $\mu_i$ denote the graded memberships assigned to DFA states $q_i$. In the worst case, the network computes for a given string the fuzzy membership function $$\mu_{RNN} = \mu_i \phi_A^+ + (n_{acc}-1)\phi_A^-$$

where $n_{acc}$ is the number of DFA states with $\mu_i > 0$.

Since $\phi_A^-$ and $\phi_A^+$ converge toward 0 and 1, respectively for increasing values of H, $\mu_{RNN}$ converges toward $\mu_i$. Notice that $|\mu_{RNN} - \mu_i|$ can be made arbitrarily small by increasing H.

Figure 5:
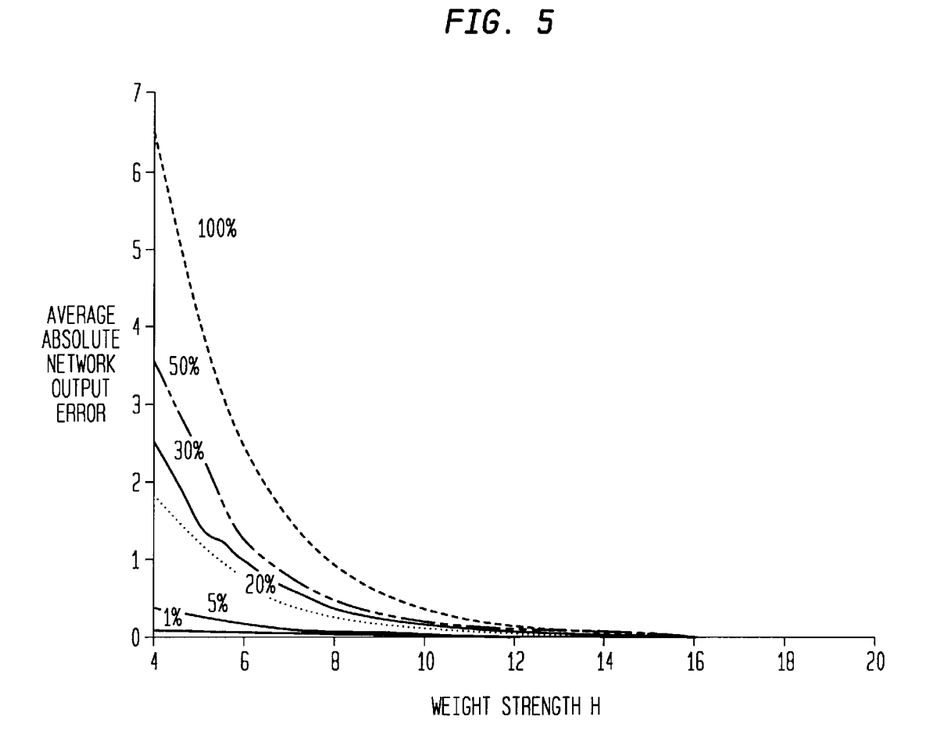
FIG. 5 is a graphical representation of network performance.

In a simulation, deterministic acceptors are randomly generated for fuzzy regular languages over the alphabet $\{0,1\}$ with 100 states as follows: For each DFA state, a transition was randomly generated for each of the two input symbols to another state. Each accepting DFA state $q_i$ was assigned a membership $0 < \mu_i < 1$; for all non-accepting states $q_j$ set $\mu_j = 0$. These acceptors were encoded into recurrent networks with 100 recurrent state neurons, two input neurons (one for each of the two input symbols 0 and 1), and one linear output neuron. Their performance was measured on 100 randomly generated strings of length 100 whose membership was determined from their deterministic acceptors. The graphs in FIG. 5 show the average absolute error of the network output as a function of the weight strength H used to encode the finite state dynamics for DFAs where 1%, 5%, 20%, 30%, 50% and 100% of all states had labels $0 < \mu_i < 1$. It will be apparent to those skilled in the art that the error exponentially decreases with increasing hint strength H, i.e. the average output error can be made arbitrarily small. The value of H for which the dynamics of all 6 DFAs remains stable for strings of arbitrary length is approximately $H \cong 9.8$ While there has been described an illustrated a preferred method of deterministic encoding of fuzzy finite state automata in continuous recurrent neural networks, it will be apparent to those skilled in the art that variations and modifications are possible without deviating from the spirit and broad principles of the present invention which shall be limited solely by the scope of the claims appended hereto.

What is claimed is:

1. A fuzzy finite state automata in continuous recurrent neural networks, the fuzzy finite state automata providing an output control signal for controlling a controlled system without requiring learning, the fuzzy finite state automata comprising:

input neurons in a recurrent neural network receiving input signals and providing strings;

sigmoidal discriminators receiving said strings and computing and providing as outputs the current state of the network;

recurrent state neurons providing as outputs a weighted sum of all the outputs of the sigmoidal discriminators;

feedback delay providing the outputs of said recurrent state neurons as time delayed inputs to said sigmoidal discriminators;

fuzzy membership weights receiving the output of said recurrent state neurons and assigning fuzzy weights to each said output so that learning is not required; and network output neurons summing the fuzzy weighted outputs for providing the output control signal for controlling the controlled system.

2. A fuzzy finite state automata in continuous recurrent neural networks as set forth in claim 1, where said sigmoidal discriminator computes the function $$S_i^{(t+1)} = g(\alpha_i(t)) = \frac{1}{1 + e^{-\alpha_i(t)}}$$

and $$\alpha_i(t) = b_i + \sum_{j,k} W_{ijk} S_j^{(t)} I_k^{(t)},$$

where $b_i$ is the bias associated with hidden recurrent state neurons $S_i$, $I_k$ is the input neuron for symbol $a_k$, the product $S_j^{(t)} I_k^{(t)}$ corresponds to the state transition $\delta(q_i, q_k) = q_i$, and $W_{ijk}$ is +H if $\delta(q_i, q_k) = q_i$ and −H if $\delta(q_i, q_k) \neq q_i$ where H is a weight strength of an output neuron.

3. A method of generating an output control signal from a fuzzy finite state automata in a continuous recurrent neural network for controlling a controlled system without requiring learning, the method comprising the steps of:

receiving input signals commensurate with a measured value and providing output strings responsive thereto;

subjecting the outputs strings to a sigmoidal discriminant function;

providing first signals commensurate with a weighted sum of all output strings subjected to the sigmoidal discriminant function and time delayed signals which were subjected to the sigmoidal discriminant function;

feeding back said time delayed signals as time delayed signals to be combined with the received input signals;

subjecting said first signals to fuzzy membership weighting so that learning is not required; and summing said fuzzy weighted signals to generate the output control signal for controlling the controlled system.

4. A method of generating an output signal in a fuzzy finite state automata in a continuous recurrent neural network as set forth in claim 3, where said sigmoidal discriminant function is $$S_i^{(t+1)} = g(\alpha_i(t)) = \frac{1}{1 + e^{-\alpha_i(t)}}$$

and $$\alpha_i(t) = b_i + \sum_{j,k} W_{ijk} S_j^{(t)} I_k^{(t)},$$

where $b_i$ is the bias associated with hidden recurrent state neurons $S_i$, $I_k$ is the input neuron for symbol $a_k$, the product $S_j^{(t)} I_k^{(t)}$ corresponds to the state transition $\delta(q_i, q_k) = q_i$ and $W_{ijk}$ is +H if $\delta(q_i, q_k) = q_i$ and −H if $[\delta(q_i, q_h) \neq q_i] \delta(q_i, q_k) \neq q_i$ where H is a weight strength of an output neuron.

* * * * *